(12) United States Patent
Kaneko et al.

(10) Patent No.: US 11,662,294 B2
(45) Date of Patent: May 30, 2023

(54) FAN FILTER UNIT AND HEPA FILTER PERFORMANCE MEASUREMENT METHOD

(71) Applicant: Hitachi Industrial Equipment Systems Co., Ltd., Tokyo (JP)

(72) Inventors: Takeshi Kaneko, Tainai (JP); Hirotoshi Sato, Tokyo (JP); Toshihiko Suwa, Tainai (JP); Makoto Yokoyama, Tainai (JP); Haruhiko Adachi, Tainai (JP); Takeshi Matsumura, Tainai (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 288 days.

(21) Appl. No.: 17/254,673

(22) PCT Filed: Apr. 15, 2020

(86) PCT No.: PCT/JP2020/016484
§ 371 (c)(1),
(2) Date: Dec. 21, 2020

(87) PCT Pub. No.: WO2021/210082
PCT Pub. Date: Oct. 21, 2021

(65) Prior Publication Data
US 2022/0136951 A1    May 5, 2022

(51) Int. Cl.
*G01N 15/08* (2006.01)
*F24F 7/00* (2021.01)
*F24F 13/28* (2006.01)

(52) U.S. Cl.
CPC ....... *G01N 15/082* (2013.01); *G01N 15/0806* (2013.01); *G01N 2015/084* (2013.01)

(58) Field of Classification Search
CPC ........ F24F 1/00; F24F 3/16; F24F 7/00; F24F 13/28; G01N 15/00; G01N 15/08; G01N 15/0806; G01N 15/082; G01N 2015/084
See application file for complete search history.

(56) References Cited

FOREIGN PATENT DOCUMENTS

| CN | 207035312 U | 2/2018 | |
|---|---|---|---|
| CN | 111351172 A | * 6/2020 | .............. F24F 13/32 |
| CN | 112414922 A | * 2/2021 | ............. G01N 15/08 |
| EP | 2191882 A2 | 6/2010 | |
| JP | 10-206310 A | 8/1998 | |
| JP | 2001-178785 A | 7/2001 | |
| JP | 2004-77095 A | 3/2004 | |
| JP | 2005-337566 A | 12/2005 | |

(Continued)

OTHER PUBLICATIONS

Chinese-language Office Action issued in Chinese Application No. 202080003707.1 dated Jul. 25, 2022 with English translation (22 pages).

(Continued)

*Primary Examiner* — Nguyen Q. Ha
(74) *Attorney, Agent, or Firm* — Crowell & Moring LLP (57) ABSTRACT

Provided is a fan filter unit with which the performance of a HEPA filter can be measured at multiple points with ease and in a short time. The fan filter unit has a first HEPA filter, a second HEPA filter, and exhaust means installed between the first HEPA filter and the second HEPA filter. The first HEPA filter, the second HEPA filter, and the exhaust means are integrated by a housing.

9 Claims, 8 Drawing Sheets

(56) References Cited

FOREIGN PATENT DOCUMENTS

JP  2006-150299 A  6/2006
JP  2009-85558 A  4/2009

OTHER PUBLICATIONS

International Search Report (PCT/ISA/210 & PCT/ISA/220) issued in PCT Application No. PCT/JP2020/016484 dated Jun. 30, 2020 (five (5) pages).
Japanese-language Written Opinion (PCT/ISA/237) issued in PCT Application No. PCT/JP2020/016484 dated Jun. 30, 2020 (four (4) pages).
Chinese-language Office Action issued in Chinese Application No. 202080003707.1 dated Dec. 2, 2022 (10 pages).

* cited by examiner

FIG.1

PRIOR ART

FAN FILTER UNIT AND HEPA FILTER PERFORMANCE MEASUREMENT METHOD

TECHNICAL FIELD

The present invention relates to the structure of a fan filter unit and a method for measuring the performance of a HEPA filter installed in the fan filter unit.

BACKGROUND ART

A fan filter unit that captures dirty air with a HEPA filter, purifies the air, and discharges the air is widely known and used so that the dirty air becomes clean. The fan filter unit is used in a semiconductor factory or the like for the purpose of dust capturing and purification and used in a medical institution, a research facility, and so on for the purpose of bacteria or virus capturing and normalization.

Patent Document 1 describes indoor air being discharged to the outside through a HEPA filter 7 by an exhaust fan 16.

CITATION LIST

Patent Document

Patent Document 1: JP 2001-178785 A

SUMMARY OF THE INVENTION

Problems to be Solved by the Invention

The performance of the fan filter unit is largely dependent on the capacity of the HEPA filter. Accordingly, in a case where rigorous performance guarantee is required, it is necessary to perform capacity measurement at multiple points on a HEPA filter plane and confirm that every measurement point satisfies predetermined performance. This is because the possibility of being averaged as a whole and erroneously determined that the performance is satisfied remains even if a part on the plane has a part that does not satisfy the performance in one-point measurement or batch measurement.

However, the fan filter unit is provided in advance with multiple components such as a fan and a drive motor as well as the HEPA filter, and thus the multi-point capacity measurement is difficult or takes time.

At present, amid the global novel coronavirus pandemic, there is an increasing need for the early construction of multiple temporary hospitals and purification spaces. For the purpose of responding to the need as well, expedited HEPA filter performance measurement is directly related to expedited temporary hospital and purification space construction, and thus the expedited measurement is of great social importance.

In this regard, an object of the present application is to provide a fan filter unit structure and a HEPA filter performance measurement method facilitating performance measurement at multiple points on a HEPA filter plane.

Solutions to Problems

Provided are a first HEPA filter, a second HEPA filter, and exhaust means installed between the first HEPA filter and the second HEPA filter. The first HEPA filter, the second HEPA filter, and the exhaust means are integrated by a housing.

Effects of the Invention

It is possible to easily measure the performance of the HEPA filter at multiple points. As a result, it is possible to contribute to expediting the construction of a temporary hospital or isolation space in particular.

MODE FOR CARRYING OUT THE INVENTION

Embodiments of the present invention will be described with reference to the drawings. It should be noted that the same constituent elements are given the same name and reference numeral as much as possible, with redundant description omitted, in the drawings for describing the embodiments.

Example 1

Figure 1:
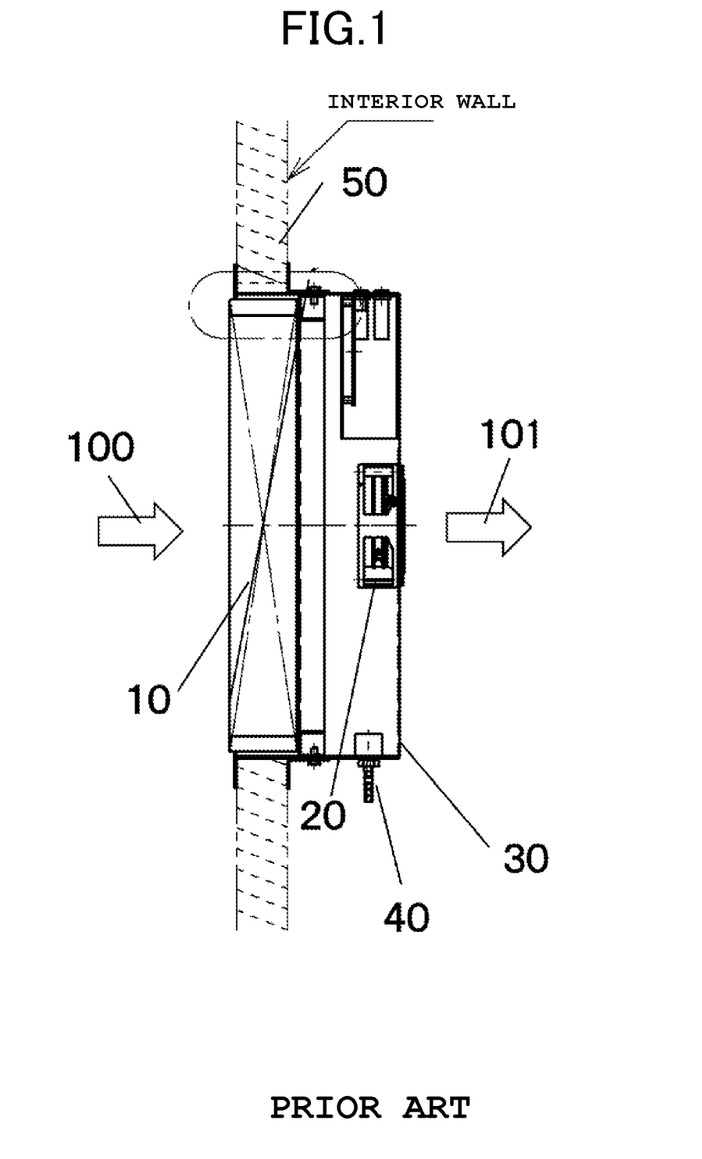
FIG. 1 is a cross-sectional view for reference of the structure of a fan filter unit.

FIG. 1 is a cross-sectional view for reference of the structure of a fan filter unit. FIG. 1 is a diagram illustrating a case where the fan filter unit is installed in an opening provided in a wall 50. When an exhaust unit 20 in a housing 30 is started, the air on the indoor side is introduced into the fan filter unit as intake air 100 and passes through a HEPA filter 10. The air purified by the HEPA filter is released to the outside as exhaust 101.

When the performance of the HEPA filter is to be measured, the measurement is performed by an aerosol being introduced into the fan filter unit together with the intake air 100 from the intake air 100 side, the aerosol that has passed through the HEPA filter, that is, the aerosol that could not be removed by the HEPA filter being guided to the outside from a measurement port 40, and an aerosol relative densitometer or the like being used. In this case, the characteristics of, for example, the entire HEPA filter are evaluated.

Meanwhile, in a case where rigorous performance guarantee is required, it is necessary to perform capacity measurement at multiple points on a HEPA filter plane and confirm that every measurement point satisfies predetermined performance. This is because the possibility of being averaged as a whole and erroneously determined that the performance is satisfied remains even if a part on the plane has a part that does not satisfy the performance in one-point measurement or batch measurement.

However, various devices such as the exhaust unit 20 and a fan and a motor included in the exhaust unit 20 are provided on the side of the exhaust 101 of the HEPA filter 10 as illustrated in FIG. 1 and it is difficult to perform the capacity measurement at the multiple points on the HEPA filter plane. Although the capacity measurement at the multiple points on the plane can be finally realized when an air collection for measurement that has a bent shape is installed and measurement is repeated for each point, over time, and every time, this takes a lot of time. This results in an increase in the time required to build a temporary hospital or a temporary purification space, and drastic measures are required against the current novel coronavirus.

Figure 2:
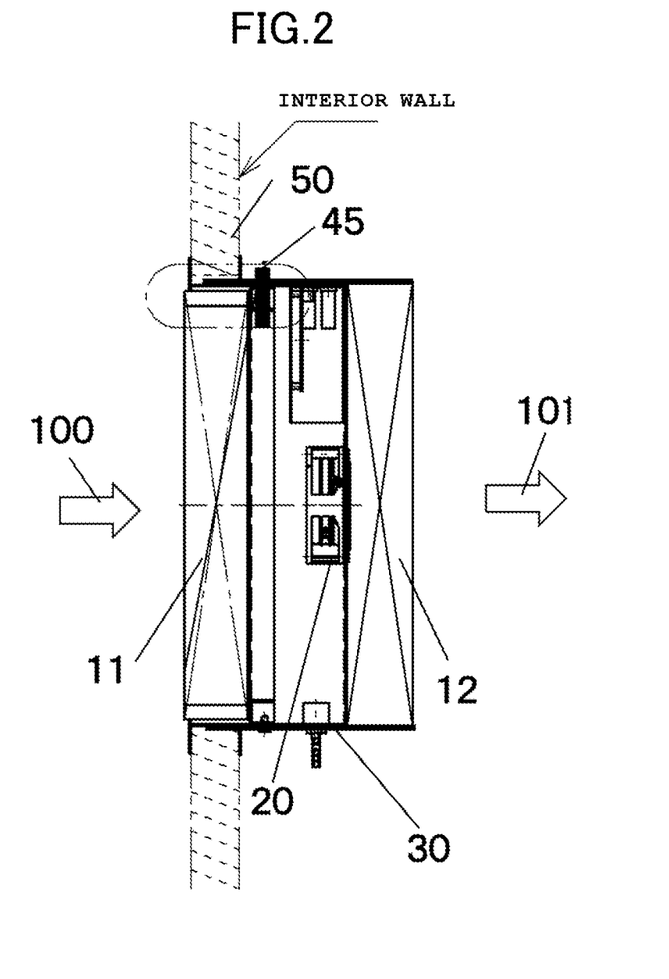
FIG. 2 is a cross-sectional view of the fan filter unit according to an example of the present invention.

FIG. 2 is a cross-sectional view of an example of the fan filter unit of the present invention. FIG. 2 differs from FIG. 1 in that a first HEPA filter 11 and a second HEPA filter 12, that is, two HEPA filters are provided on the intake side and the exhaust side of the exhaust unit 20, respectively. As a result, the air on the indoor side passes through the first HEPA filter 11, subsequently passes through the space where the exhaust unit 20 is installed, further passes through the second HEPA filter 12, and is discharged to the outside. In this structure, first, the HEPA filter is dualized, and thus an improvement in removal capacity itself is realized and an improvement in redundancy against HEPA filter deterioration is realized. Although it is also possible to realize the dualization of the HEPA filter itself by, for example, providing another HEPA filter at another part of piping separate from the fan filter unit, such a case requires a lot of labor for replacement and management of both HEPA filters. From this point as well, the structure that is disclosed in FIG. 2 is extremely excellent in terms of the practicality including maintainability.

The above-described structure itself has various advantages and is a major point of the present invention.

Further, FIG. 2 is characterized in that an aerosol introduction port 45 is provided at a part of the housing 30 in the region between the first HEPA filter 11 and the second HEPA filter 12. HEPA filter performance measurement by means of the aerosol introduction port 45 will be described below with reference to FIGS. 3 to 5.

Figure 3:
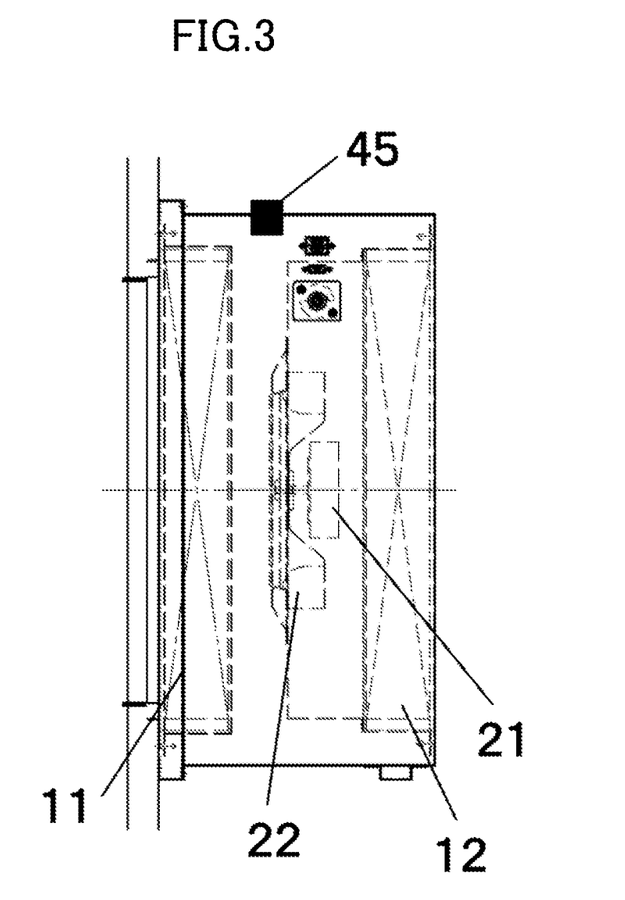
FIG. 3 is a cross-sectional view of the fan filter unit according to an example of the present invention.

Although FIG. 3 is a drawing corresponding to FIG. 2, a motor 21 and a fan 22 constituting the exhaust unit 20 are illustrated in FIG. 3. It is desirable that the aerosol introduction port 45 is provided closer to the first HEPA filter 11 side than the fan 22. This is to more accurately measure the performance of the HEPA filter.

Figure 4:
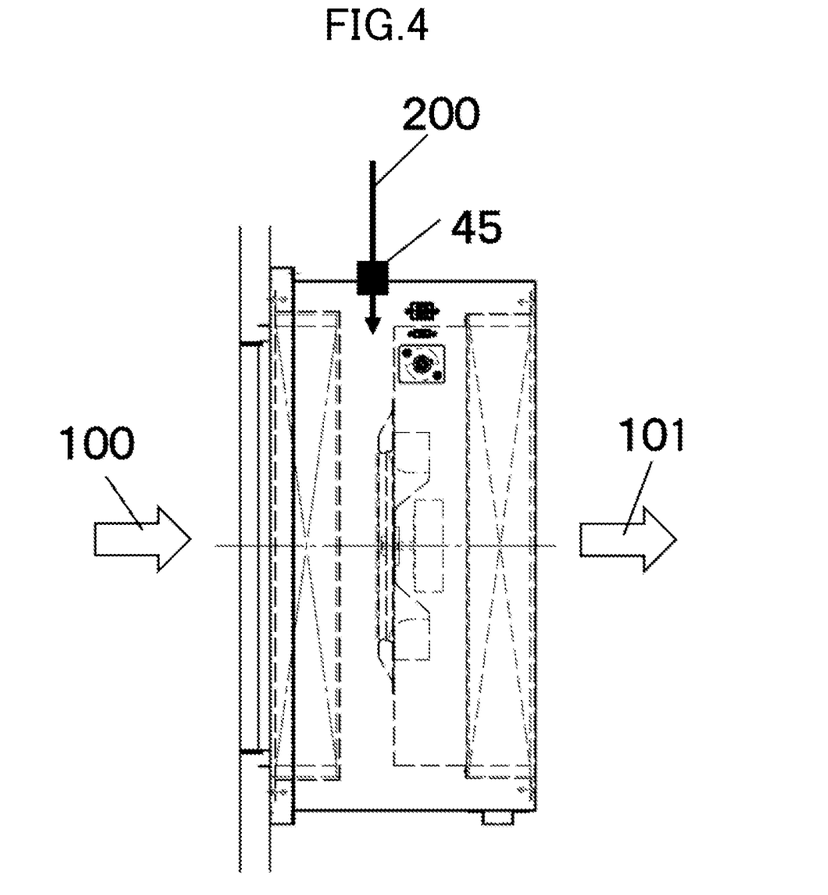
FIG. 4 is an explanatory diagram of a HEPA filter performance measurement method according to an example of the present invention.

The method for HEPA filter performance measurement in the fan filter unit of this example will be described with reference to FIGS. 4 and 5. The air flow during the measurement will be described with reference to FIG. 4. An aerosol for performance evaluation is introduced into the region between the first HEPA filter 11 and the second HEPA filter 12 from the aerosol introduction port 45. An aerosol flow 200 is illustrated in FIG. 4. The fan 22 rotates by the motor 21 rotating, and the introduced aerosol passes through the second HEPA filter 12 and is discharged to the outside as the intake air 100 flows. At this time, the performance of the HEPA filter is evaluated by the exhaust from the second HEPA filter 12 being captured at multiple points in a planar manner and measured by means of an aerosol relative densitometer or the like.

Figure 5:
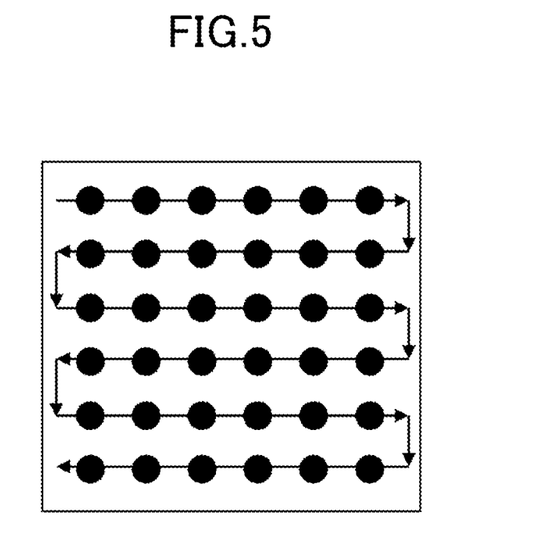
FIG. 5 is an explanatory diagram of the HEPA filter performance measurement method according to an example of the present invention.

FIG. 5 is a plan view describing the measurement points from the second HEPA filter 12. The black circles in FIG. 5 indicate the points where the exhaust is captured and measured, and the arrows in FIG. 5 indicate the aspect of movement of the measurement points. It is possible to carry out a HEPA filter performance test with ease and in a short time by operating the fan filter unit and simultaneously introducing the aerosol for performance evaluation, moving the measurement point, and performing the measurement by means of the aerosol relative densitometer or the like in this manner.

The performance of the second HEPA filter 12 is mainly measured as for the performance of the HEPA filter in this measurement method. However, in an actual state of use, the internal air is purified by both the first HEPA filter 11 and the second HEPA filter 12 and discharged to the outside. In other words, a product for which predetermined performance has been confirmable by a HEPA filter performance test being performed on the fan filter unit of this example by the measurement method of this example has an advantage that it is possible to realize a product positioned on the safer side, which has further purification capacity or margin of the first HEPA filter 11, in an actual state of use.

As an example of the test method that pertains to examples in which rigor is required for the HEPA filter in particular, it is possible to realize a more rigorous HEPA filter permeability test by continuously performing sweeping while shifting the introduction position of the exhaust introduced into the aerosol relative densitometer or while moving the aerosol relative densitometer at a speed of movement of 5 cm/s or less at a position within 25 mm from the exhaust-side surface of the second HEPA filter 12.

Although various things such as a lid, a flap, a cock, and a valve can be applied to the aerosol introduction port 45, it is more desirable from the viewpoint of being fail-safe to have a lock function or a check valve functioning only when an aerosol is introduced because forgetting to close the aerosol introduction port 45 leads to the air flow that is yet to pass through the second HEPA filter 12 flowing to the outside during actual operation.

In addition, the fan filter unit of this example also includes a case where the aerosol introduction port 45 is not provided.

In this case, it is possible to substitute the aerosol introduction port 45 by introducing a test aerosol together with the intake air 100 from the first HEPA filter 11 side. However, in a case where the test aerosol is introduced together with the intake air 100, the air purified by the first HEPA filter 11 passes through the second HEPA filter 12 and is further purified, and thus the performance of the HEPA filter cannot be individually confirmed. It is necessary to introduce a high-concentration aerosol from the aerosol introduction port 45 to more rigorously confirm the performance of the second HEPA filter 12.

Example 2

Figure 6:
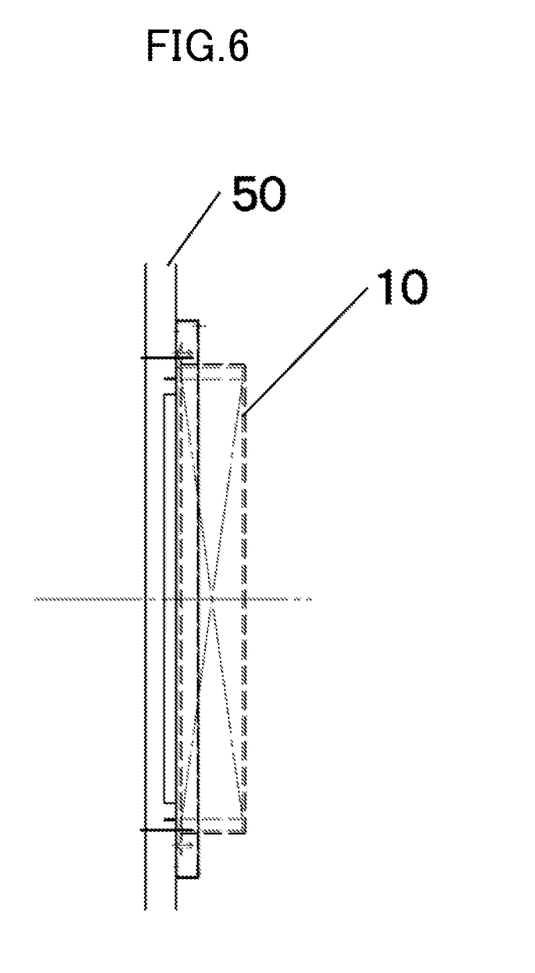
FIG. 6 is an explanatory diagram of the HEPA filter performance measurement method according to another example of the present invention.

FIG. 6 is a diagram describing another example of the present invention. The HEPA filter 10 is installed first so as to correspond to the opening in the wall 50. The method for HEPA filter performance measurement according to this example will be described with reference to FIG. 7. First, a test blower 70 is temporarily installed on the intake side of the HEPA filter 10. While the test blower 70 is operated, a test aerosol is introduced into the HEPA filter 10 together with the intake air 100 and in the form of the aerosol flow 200. The exhaust from the HEPA filter 10 is discharged from the opposite side in the form of the exhaust 101. As illustrated in FIG. 5, the aerosol in this exhaust is measured at multiple points on the HEPA filter plane or while sweeping is continuously performed. As a result, it is possible to perform a permeability test in the HEPA filter 10 or the first HEPA filter 11 alone.

In a case where the final and completed structure is the structure that is illustrated in FIG. 3, the first HEPA filter 11 of FIG. 3 is used as the HEPA filter 10 of FIG. 6, and the permeability of the second HEPA filter 12 is tested in the completed structure illustrated in FIGS. 3 and 4 after the permeability of the first HEPA filter 11 alone is tested, it becomes possible, by carrying out the permeability tests, to guarantee that a highly infectious and dangerous virus or the like is reliably collected by the two HEPA filters.

Figure 7:
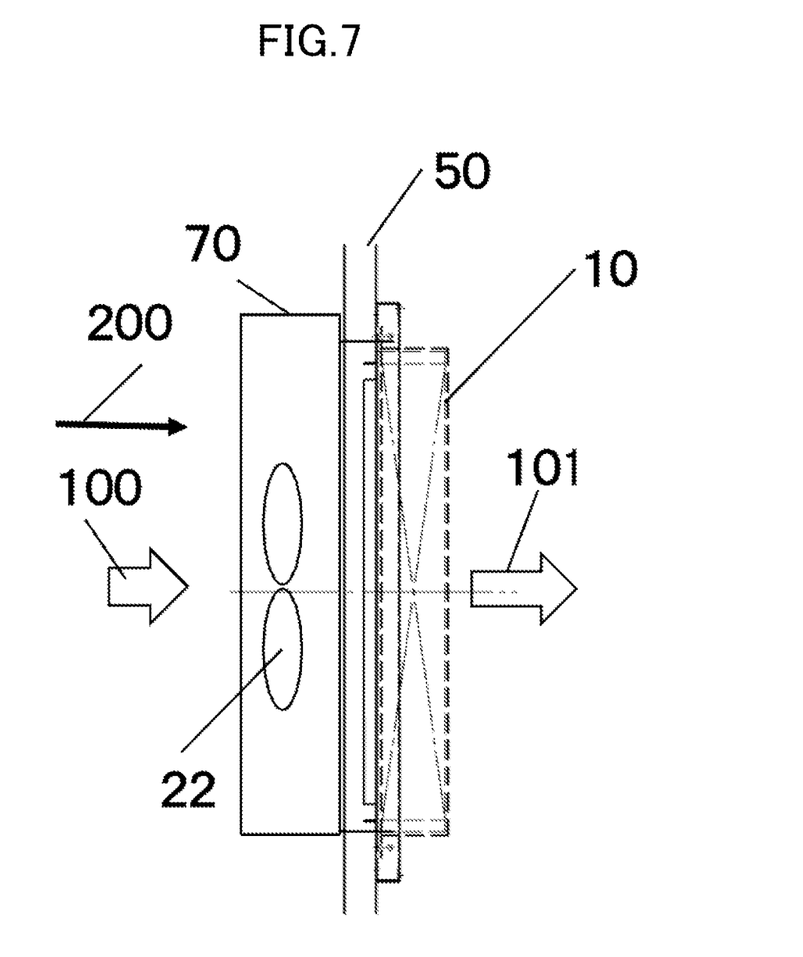
FIG. 7 is an explanatory diagram of the HEPA filter performance measurement method according to another example of the present invention.
Figure 8:
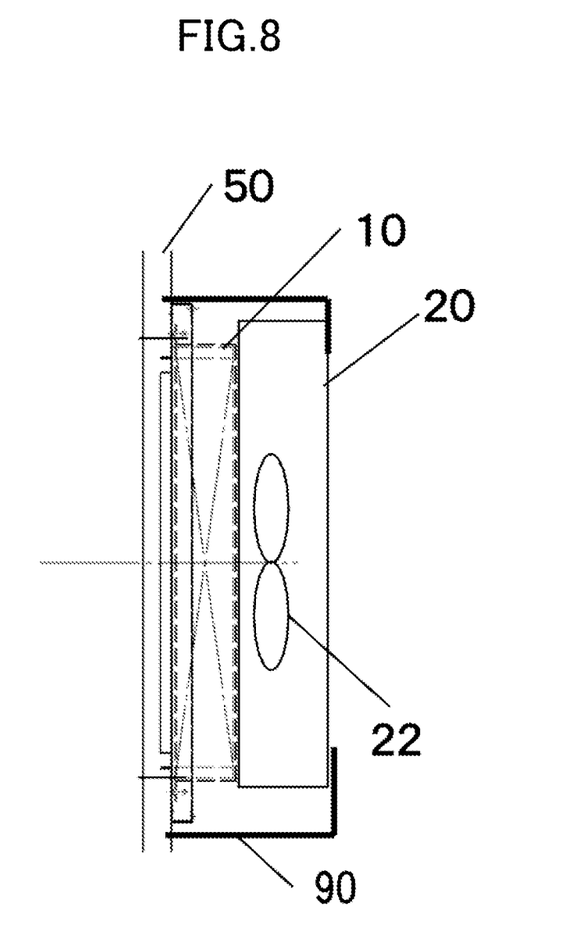
FIG. 8 is an explanatory diagram of the HEPA filter performance measurement method according to another example of the present invention.

A case where a state where the fan filter unit is completed is illustrated in FIG. 8 will be described. After it is confirmed that the first HEPA filter satisfies predetermined performance, the test blower 70 shown in FIG. 7 is removed and the exhaust unit 20 used during actual use is installed on the exhaust side of the HEPA filter 10 on the opposite side. At this time, a cover case 90 is installed so as to surround the HEPA filter 10 and the exhaust unit 20 such that air discharge from the HEPA filter becomes smoother.

It should be noted that the exhaust unit 20 and then the second HEPA filter 12 are installed on the exhaust side of the first HEPA filter 11 and the cover case 90 is further installed so as to surround the first HEPA filter 11, the exhaust unit 20, and the second HEPA filter 12, in a case where a permeation test is performed on the second HEPA filter 12 instead of the first HEPA filter 11 at this time and the structure of FIG. 4 can be realized as a result of the installation.

This example is characterized in that the performance of the first HEPA filter 11 is measured by means of the test blower 70 during an on-site installation, the fan filter unit is subsequently completed by the exhaust unit 20 being attached, and the performance of the first HEPA filter 11 does not need to be measured on-site in the completed state of the fan filter unit. As a result, the number of HEPA filters to be tested on-site can be reduced as compared with the case of Example 1, and thus cost reduction for on-site testing can be achieved. The fan filter unit that is described in Example 1 is a more desirable form when the aspect of performance is given higher priority.

Throughout the present invention, the wall 50 may be of any type insofar as the wall has a function as an inter-air partition. Included are a case where the wall has an interior-exterior partitioning function as a part of piping, a case where the wall is an inside-outside partition for a device, and a case where the wall is flexible as in the case of a partition sheet for emergency response to the current novel coronavirus or the like. In a case where a simple isolation facility is to be immediately built with a flexible sheet such as a tent and a frame in particular, an opening can be provided at a part of the sheet, installation and caulking can be performed, and it can be taken with an immediate performance test and facility operation in the present invention, and thus it is possible to realize a dramatic start-up time reduction effect. In this manner, the present invention is applicable to various structures such as hospitals, isolation wards, temporary isolation facilities, temporary tents, and factories.

Throughout the present invention, the aerosol can be changed to various gases for inspection purposes or a test body containing a gas as a main component. For example, when a dust removal rate matters regarding semiconductor manufacturing purposes or the like, the aerosol can be read instead as a gas containing dust in advance.

REFERENCE SIGNS LIST

10 HEPA filter
11 First HEPA filter
12 Second HEPA filter
20 Exhaust unit
21 Motor
22 Fan
30 Housing
40 Measurement port
45 Aerosol introduction port
50 Wall
70 Test blower
90 Cover case
100 Intake air
101 Exhaust
200 Aerosol flow

The invention claimed is:

1. A fan filter unit comprising:
a first HEPA filter;
a second HEPA filter;
exhaust means installed between the first HEPA filter and the second HEPA;
a housing having a test gas introduction port; and
a cover,
wherein
the first HEPA filter, the second HEPA filter, and the exhaust means are integrated by the housing,
wherein the first HEPA filter performance is confirmed by:
firstly, positioning and attaching only the first HEPA filter on an intake side of the fan filter unit to an opening in a wall,
secondly, positioning and installing a test blower on an indoor side or the intake side of the fan filter unit,
thirdly, supplying a test gas on the indoor side or the intake side of the first HEPA filter, while operating the test blower and simultaneously measuring a permeation concentration of the test gas on an exhaust side of the fan filter unit,
fourthly, confirming that the first HEPA filter performance satisfies predetermined performance based on a result of the permeation concentration measurement,
then, the test blower is removed, and
wherein the second HEPA filter performance is confirmed by:
firstly, installing the exhaust means on the exhaust side of the first HEPA filter,
secondly, positioning and attaching the second HEPA filter on the exhaust side of the fan filter unit,
thirdly, supplying a test gas from the introduction port located in a region between the first HEPA filter and the second HEPA filter, while operating the exhaust means and simultaneously measuring a permeation concentration of the test gas on the exhaust side of the fan filter unit,
fourthly, confirming that the second HEPA filter satisfies predetermined performance based on a result of the permeation concentration measurement,
then, attaching the cover integrating the two HEPA filters and the exhaust means to the exhaust side of the fan filter unit.

2. The fan filter unit according to claim 1, wherein the exhaust means has a fan and a motor and the test gas introduction port is positioned closer to the first HEPA filter side than the fan.

3. The fan filter unit according to claim 1, wherein the test gas introduction port includes a lid, a flap, a cock, or a valve.

4. The fan filter unit according to claim 3, wherein the test gas introduction port has a lock function or a check valve.

5. A HEPA filter performance measurement method for introducing an aerosol from the test gas introduction port with respect to the fan filter unit according to claim 1 and measuring a permeation concentration of the test gas on an exhaust side of the second HEPA filter.

6. A structure purifying outdoor exhaust with the fan filter unit according to claim 1.

7. A HEPA filter performance test method comprising the following steps of:
(Step 1) positioning and attaching a HEPA filter at an opening provided in a wall surface;
(Step 2) positioning and installing a test blower on an indoor side or an intake side of the HEPA filter;
(Step 3) supplying a test gas from the intake side of the HEPA filter while operating the test blower and simultaneously measuring a permeation concentration of the test gas on an exhaust side of the HEPA filter;
(Step 4) removing the test blower after confirming that the HEPA filter satisfies predetermined performance based on a result of the permeation concentration measurement; and
(Step 5) attaching an exhaust unit and a cover integrating the HEPA filter and the exhaust unit to the exhaust side of the HEPA filter.

8. A fan filter unit comprising:
a HEPA filter; and
an exhaust unit,
wherein HEPA filter performance is confirmed by
firstly, positioning and attaching only the HEPA filter at an opening provided in a wall surface,
secondly, positioning and installing a test blower on an indoor side or an intake side of the HEPA filter,
thirdly, supplying a test gas from the intake side of the HEPA filter while operating the test blower and simultaneously measuring a permeation concentration of the test gas on an exhaust side of the HEPA filter,
fourthly, removing the test blower after confirming that the HEPA filter satisfies predetermined performance based on a result of the permeation concentration measurement, and
fifthly, attaching the exhaust unit and a cover integrating the HEPA filter and the exhaust unit to the exhaust side of the HEPA filter.

9. A structure purifying outdoor exhaust with the fan filter unit according to claim 8.

* * * * *